United States Patent
Wada et al.

(10) Patent No.: US 9,586,293 B2
(45) Date of Patent: Mar. 7, 2017

(54) WELDING GAS AND PLASMA WELDING METHOD

(75) Inventors: Katsunori Wada, Kai (JP); Hiroki Oono, Kai (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 945 days.

(21) Appl. No.: 13/877,724

(22) PCT Filed: Oct. 6, 2011

(86) PCT No.: PCT/JP2011/073076
§ 371 (c)(1),
(2), (4) Date: Apr. 4, 2013

(87) PCT Pub. No.: WO2012/046799
PCT Pub. Date: Apr. 12, 2012

(65) Prior Publication Data
US 2013/0193116 A1    Aug. 1, 2013

(30) Foreign Application Priority Data
Oct. 7, 2010   (JP) ................................. 2010-227513

(51) Int. Cl.
*B23K 10/02* (2006.01)
*B23K 35/38* (2006.01)

(52) U.S. Cl.
CPC .............. *B23K 35/38* (2013.01); *B23K 10/02* (2013.01); *B23K 35/383* (2013.01); *B23K 2203/04* (2013.01)

(58) Field of Classification Search
CPC ...... B23K 10/02; B23K 10/00; B23K 35/383; B23K 9/167
(Continued)

(56) References Cited

U.S. PATENT DOCUMENTS 5,464,958 A * 11/1995 Flowers ............... B23K 10/006
                                                      219/121.54
5,938,948 A *  8/1999 Oros .................... B23K 10/022
                                                      219/121.45
(Continued)

FOREIGN PATENT DOCUMENTS

JP      51-148646    12/1976
JP      54-149043    11/1979
(Continued)

OTHER PUBLICATIONS

International Search Report for PCT/JP2011/073076 mailed Nov. 1, 2011.
(Continued)

*Primary Examiner* — David Angwin
*Assistant Examiner* — Lawrence Samuels
(74) *Attorney, Agent, or Firm* — Nixon & Vanderhye P.C.

(57) ABSTRACT

A welding method, which performs non-keyhole welding of a ferritic stainless steel having a plate thickness of 3 mm or less using a plasma welding torch (10), includes supplying an inert gas, as a pilot gas (23), into the gap between a tungsten electrode (11) and an insert chip (12) at a flow rate of 2.1 m/sec or less, and supplying a shield gas (24) into the gap between the insert chip (12) and a shield cap (15), wherein a mixed gas prepared by adding either 0.5 to 4 vol % of oxygen gas or 1 to 6 vol % of carbon dioxide gas to an inert gas is used as the shield gas (24).

4 Claims, 3 Drawing Sheets

(58) Field of Classification Search
USPC ...... 219/121.11, 121.36, 121.45, 121.46, 73, 219/74, 72, 75, 121.43, 121.38, 121.42, 219/121.59
See application file for complete search history.

(56) References Cited

U.S. PATENT DOCUMENTS

| | | | | |
|---|---|---|---|---|
| 6,025,570 | A * | 2/2000 | Fortain | B23K 10/006 219/121.45 |
| 6,281,464 | B1 * | 8/2001 | Topper | B23K 9/162 219/137 R |
| 6,392,184 | B1 * | 5/2002 | Yokota | B23K 9/295 219/74 |
| 8,324,524 | B2 * | 12/2012 | Wada | B23K 9/16 219/121.46 |
| 2008/0237202 | A1 * | 10/2008 | Twarog | H05H 1/34 219/121.52 |
| 2010/0133241 | A1 * | 6/2010 | Wilhelm | B23K 9/0953 219/121.46 |
| 2011/0017712 | A1 * | 1/2011 | Wada | B23K 9/16 219/121.46 |
| 2011/0210101 | A1 * | 9/2011 | Smallwood | B23K 9/013 219/121.44 |

FOREIGN PATENT DOCUMENTS

| | | | |
|---|---|---|---|
| JP | 6-315771 | 11/1994 | |
| JP | 7-16753 | 1/1995 | |
| JP | 7-303916 | 11/1995 | |
| JP | WO 2009119561 A1 * | 10/2009 | ............ B23K 9/16 |

OTHER PUBLICATIONS

Written Opinion of the International Searching Authority mailed Nov. 1, 2011.

* cited by examiner

FIG. 2

| | COMPOSITION OF SHIELD GAS | PHOTOGRAPH OF SURFACE OF WELD BEAD | PHOTOGRAPH OF PENETRATION WELD BEAD | QUALITY |
|---|---|---|---|---|
| COMPARATIVE EXAMPLE 15 | Ar | | | × |
| EXAMPLE 1-1 | Ar-0.5%$O_2$ | | | ○ |
| EXAMPLE 2-1 | Ar-0.8%$O_2$ | | | ○ |
| EXAMPLE 3-1 | Ar-1%$O_2$ | | | ○ |
| EXAMPLE 4-1 | Ar-1.5%$O_2$ | | | ○ |
| EXAMPLE 5-1 | Ar-2%$O_2$ | | | ○ |
| EXAMPLE 6-1 | Ar-3%$O_2$ | | | ○ |
| EXAMPLE 7-1 | Ar-4%$O_2$ | | | ○ |
| COMPARATIVE EXAMPLE 16 | Ar-5%$O_2$ | | | × |

FIG. 3

| | COMPOSITION OF SHIELD GAS | PHOTOGRAPH OF SURFACE OF WELD BEAD | PHOTOGRAPH OF PENETRATION WELD BEAD | QUALITY |
|---|---|---|---|---|
| EXAMPLE 8-1 | Ar-1%$CO_2$ | | | ○ |
| EXAMPLE 9-1 | Ar-2%$CO_2$ | | | ○ |
| EXAMPLE 10-1 | Ar-3%$CO_2$ | | | ○ |
| EXAMPLE 11-1 | Ar-4%$CO_2$ | | | ○ |
| EXAMPLE 12-1 | Ar-4.5%$CO_2$ | | | ○ |
| EXAMPLE 13-1 | Ar-5%$CO_2$ | | | ○ |
| EXAMPLE 14-1 | Ar-6%$CO_2$ | | | ○ |
| COMPARATIVE EXAMPLE 17 | Ar-7%$O_2$ | | | × |

WELDING GAS AND PLASMA WELDING METHOD

This application is the U.S. national phase of International Application No. PCT/JP2011/073076 filed 6 Oct. 2011 which designated the U.S. and claims priority to JP 2010-227513 filed 7 Oct. 2010, the entire contents of each of which are hereby incorporated by reference.

TECHNICAL FIELD

The present invention relates to a welding gas and a plasma welding method which are used when non-keyhole welding of a ferritic stainless steel is performed using a plasma.

Priority is claimed on Japanese Patent Application No. 2010-227513, filed Oct. 7, 2010, the content of which is incorporated herein by reference.

BACKGROUND ART

Plasma welding exhibits excellent heat concentration compared with TIG welding, and therefore welding can be performed at high speed with a narrow weld bead width, and strain can also be reduced.

One type of plasma welding method is keyhole welding, which is a one-side penetration welding method that uses a high energy density arc.

In keyhole welding, the plasma flow pushes aside the molten metal and penetrates through the base metal, forming a keyhole. As the welding progresses, the molten metal moves backward through the wall surface, and the keyhole forms a weld pool which becomes the weld bead.

As a result, the plate thickness that can be subjected to I-groove butt welding using one-pass one-side welding is generally not more than 6 mm for mild steel plate, and not more than approximately 8 mm for stainless steel plate.

Further, plasma welding uses tungsten for the electrode in the same manner as TIG welding, but because the tungsten electrode is located inside an insert chip, the electrode is not exposed to oxidizing gas, does not undergo sputtering, suffers minimal electrode wear, and can be used to perform high-quality welding for long periods, meaning running costs can be kept to a minimum.

Keyhole welding is widely used, mainly for manufacturing pressure vessels and piping joints, and for welding exhaust system components and the like. In this type of keyhole welding, for example, a dual shield nozzle torch (hereafter simply referred to as a "plasma welding torch") such as that disclosed in Patent Document 1 is used.

The plasma welding torch includes a tungsten electrode, an insert chip which is disposed so as to surround the outer periphery of the tungsten electrode, and a shield cap which is disposed so as to surround the outer periphery of the insert chip.

The welding gas supplied to the plasma welding torch is composed of a pilot gas which is fed into the gap between the tungsten electrode and the insert chip, and a shield gas which is fed into the gap between the insert chip and the shield cap.

The pilot gas protects the tungsten electrode that generates the plasma, and also welds the welding workpiece. The shield gas prevents oxidation of the weld pool and the base material.

When keyhole welding is performed on an austenitic stainless steel, because the austenitic stainless steel contains Ni and the weld pool is viscous, welding can be performed without the weld pool itself falling.

On the other hand, when keyhole welding is performed on a ferritic stainless steel, the ferritic stainless steel does not contain Ni. Consequently, the weld pool of the ferritic stainless steel has a lower viscosity than the weld pool of an austenitic stainless steel, causing the weld pool itself to fall. As a result, keyhole welding cannot be performed.

Accordingly, the type of non-keyhole welding disclosed in Patent Document 2 is typically performed for welding ferritic stainless steel.

Further, Patent Document 2 discloses the use of argon gas or a mixed gas prepared by adding hydrogen to argon as the welding gas (the pilot gas and the shield gas) when performing non-keyhole welding.

CITATION LIST

Patent Literature

[Patent Literature 1]
 Japanese Unexamined Patent Application, First Publication No. Hei 07-16753
[Patent Literature 2]
 Japanese Unexamined Patent Application, First Publication No. Hei 06-315771

SUMMARY OF INVENTION

Technical Problem

In the non-keyhole welding described above, in order to ensure that the pilot gas does not penetrate through the steel material, the welding is performed with a reduced supply flow for the pilot gas. Specifically, in the case of an austenitic stainless steel having a plate thickness of 2 mm, the supply flow of the pilot gas is set, for example, to 1.2 l/min, whereas the pilot gas supply flow for a ferritic stainless steel of the same thickness as the austenitic stainless steel is set to 0.6 l/min.

Furthermore, when plasma welding of ferritic stainless steel is performed on the type of thin plate used in the exhaust system components of construction machines and automobiles and the like, the supply flow of the pilot gas is reduced even further, and fine adjustments are required.

As a result, when argon gas is used for the welding gas (the shield gas and the pilot gas), problems may arise, including meandering of the weld bead, the occurrence of undercutting, and an inability to obtain a penetration bead.

Accordingly, an object of the present invention is to provide a welding gas and a plasma welding method which, when used for performing non-keyhole welding of a ferritic stainless steel, can suppress meandering of the weld bead and the occurrence of undercutting, and enable the penetration weld bead to be produced with favorable form.

Solution to Problem

Aspects of the present invention for achieving the object described above are as follows.

(1) A welding gas which is used when non-keyhole welding of a ferritic stainless steel having a plate thickness of 3 mm or less is performed using a plasma welding torch, the plasma welding torch having a tungsten electrode, an insert chip disposed so as to surround the outer periphery of the tungsten electrode, and a shield cap disposed so as to surround the outer periphery of the insert chip, and the tip of the tungsten electrode being disposed inside the insert chip, wherein the welding gas includes a pilot gas that is fed into the gap between the tungsten electrode and the insert chip, and a shield gas that is fed into the gap between the insert chip and the shield cap, the pilot gas is an inert gas having a flow rate of 2.1 m/sec or less, and the shield gas is a mixed gas prepared by adding at least 0.5 vol % but not more than 4 vol % of oxygen gas to an inert gas.

(2) The welding gas according to (1), wherein the concentration of the oxygen gas is at least 0.8 vol % but not more than 1.5 vol %.

(3) A welding gas which is used when non-keyhole welding of a ferritic stainless steel having a plate thickness of 3 mm or less is performed using a plasma welding torch, the plasma welding torch having a tungsten electrode, an insert chip disposed so as to surround the outer periphery of the tungsten electrode, and a shield cap disposed so as to surround the outer periphery of the insert chip, and the tip of the tungsten electrode being disposed inside the insert chip, wherein the welding gas includes a pilot gas that is fed into the gap between the tungsten electrode and the insert chip, and a shield gas that is fed into the gap between the insert chip and the shield cap, the pilot gas is an inert gas having a flow rate of 2.1 m/sec or less, and the shield gas is a mixed gas prepared by adding at least 1 vol % but not more than 6 vol % of carbon dioxide gas to an inert gas.

(4) The welding gas according to (3), wherein the concentration of the carbon dioxide gas is at least 2 vol % but not more than 4.5 vol %.

(5) A plasma welding method which performs non-keyhole welding of a ferritic stainless steel having a plate thickness of 3 mm or less using a plasma welding torch, the plasma welding torch having a tungsten electrode, an insert chip disposed so as to surround the outer periphery of the tungsten electrode, and a shield cap disposed so as to surround the outer periphery of the insert chip, and the tip of the tungsten electrode being disposed inside the insert chip, wherein the method includes supplying an inert gas, as a pilot gas, into the gap between the tungsten electrode and the insert chip at a flow rate of 2.1 m/sec or less, and supplying, as a shield gas, a mixed gas prepared by adding at least 0.5 vol % but not more than 4 vol % of oxygen gas to an inert gas into the gap between the insert chip and the shield cap.

(6) The plasma welding method according to (5), wherein the concentration of the oxygen gas is at least 0.8 vol % but not more than 1.5 vol %.

(7) A plasma welding method which performs non-keyhole welding of a ferritic stainless steel having a plate thickness of 3 mm or less using a plasma welding torch, the plasma welding torch having a tungsten electrode, an insert chip disposed so as to surround the outer periphery of the tungsten electrode, and a shield cap disposed so as to surround the outer periphery of the insert chip, and the tip of the tungsten electrode being disposed inside the insert chip, wherein the method includes supplying an inert gas, as a pilot gas, into the gap between the tungsten electrode and the insert chip at a flow rate of 2.1 m/sec or less, and supplying, as a shield gas, a mixed gas prepared by adding at least 1 vol % but not more than 6 vol % of carbon dioxide gas to an inert gas into the gap between the insert chip and the shield cap.

(8) The plasma welding method according to (7), wherein the concentration of the carbon dioxide gas is at least 2 vol % but not more than 4.5 vol %.

Advantageous Effects of Invention

According to the present invention, when a ferritic stainless steel having a plate thickness of 3 mm or less is subjected to non-keyhole welding, meandering of the weld bead and undercutting can be suppressed, and the penetration weld bead can be produced with favorable form.

BRIEF DESCRIPTION OF DRAWINGS

FIG. 2 is a diagram (part 1) illustrating photographs of welding base materials that have been welded using plasma welding methods according to examples of the present invention, photographs of welding base materials that have been welded using plasma welding methods of comparative examples, and evaluation results for these examples and comparative examples.

FIG. 3 is a diagram (part 2) illustrating photographs of welding base materials that have been welded using plasma welding methods according to examples of the present invention, photographs of welding base materials that have been welded using plasma welding methods of comparative examples, and evaluation results for these examples and comparative examples.

BRIEF DESCRIPTION OF DRAWINGS

Figure 1:
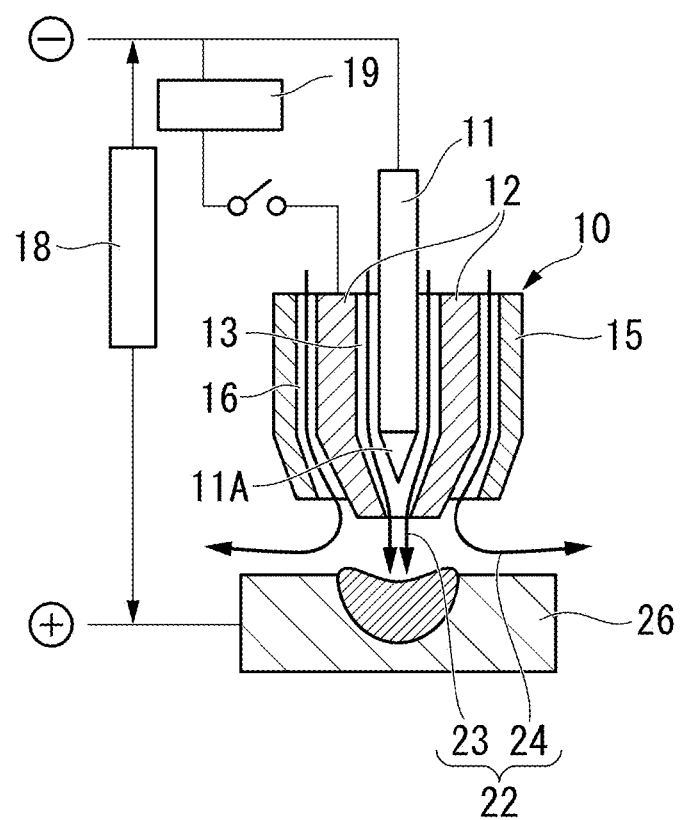
FIG. 1 is a cross-sectional view illustrating the basic structure of a plasma welding torch.

Embodiments of the present invention are described below in detail with reference to the drawings. The drawings used in the following description are used only to explain the structures of the embodiments of the present invention, and the size, thickness and dimensions and the like of the various illustrated components may differ from the dimensional relationships found in an actual plasma welding torch.

FIG. 1 is a cross-sectional view illustrating the basic structure of a plasma welding torch 10. The structure of the plasma welding torch 10 (used in the plasma welding method of the present embodiment) is described below.

As illustrated in FIG. 1, the plasma welding torch 10 contains a tungsten electrode 11, an insert chip 12, a pilot gas passage 13, a shield cap 15, and a shield gas passage 16.

The tungsten electrode 11 is an electrode that generates a plasma from the tip 11A of the electrode. One end of the tungsten electrode 11 is connected electrically to a main arc power source 18 that is connected electrically to a welding base material 26, and to a pilot arc power source 19.

The insert chip 12 is disposed so as to surround the outer periphery of the tungsten electrode 11. The tip 11A of the tungsten electrode 11 is housed inside the insert chip 12. The insert chip 12 is connected electrically to the pilot arc power source 19.

The pilot gas passage 13 is the gap formed between the tungsten electrode 11 and the insert chip 12. When the welding base material 26 is subjected to non-keyhole welding, a pilot gas 23 that constitutes part of a welding gas 22 flows through the pilot gas passage 13.

An inert gas with a flow rate of 2.1 m/sec or less (and preferably 1.2 to 2.1 msec) is used as the pilot gas 23. Argon (Ar) gas or the like can be used as the inert gas. The pilot gas 23 is a gas that protects the tungsten electrode 11, and is also the gas that welds the welding base material 26.

A ferritic stainless steel having a plate thickness of 3 mm or less (and preferably 2 to 3 mm) is used as the welding base material 26.

The shield cap 15 is disposed so as to surround the outer periphery of the insert chip 12.

The shield gas passage 16 is the gap formed between the insert chip 12 and the shield cap 15. When the welding base material 26 is subjected to non-keyhole welding, a shield gas 24 that constitutes part of the welding gas 22 flows through the shield gas passage 16.

In the present embodiment, the welding gas 22 is composed of the pilot gas 23 and the shield gas 24.

A mixed gas prepared by adding at least 0.5 vol % but not more than 4 vol % of oxygen ($O_2$) gas to an inert gas (such as argon (Ar) gas) can be used as the shield gas 24. In this case, as described above, an inert gas (such as argon (Ar) gas) with a flow rate of 2.1 m/sec or less is used as the pilot gas 23.

In this manner, when subjecting a ferritic stainless steel (the welding base material 26) having a plate thickness of 3 mm or less to non-keyhole welding, by using an inert gas (such as argon (Ar) gas) with a flow rate of 2.1 m/sec or less as the pilot gas 23, and using a mixed gas prepared by adding at least 0.5 vol % but not more than 4 vol % of oxygen gas to an inert gas (such as argon (Ar) gas) as the shield gas 24, meandering of the weld bead and the occurrence of undercutting can be suppressed in the ferritic stainless steel having a plate thickness of 3 mm or less undergoing the non-keyhole welding, and a penetration weld bead can be produced with favorable form.

If the concentration of the aforementioned oxygen gas is less than 0.5 vol %, then the form of the penetration weld bead tends to become unstable. Further, if the concentration of the oxygen gas exceeds 4 vol %, then the penetration weld bead tends to oxidize.

If the concentration of the oxygen gas contained within the shield gas 24 is set to at least 0.8 vol % but not more than 1.5 vol %, then meandering of the weld bead and undercutting can be better suppressed, and the penetration weld bead can be produced with even better form.

Furthermore, a mixed gas prepared by adding at least 1 vol % but not more than 6 vol % of carbon dioxide gas ($CO_2$ gas) to an inert gas (such as argon (Ar) gas) may also be used as the shield gas 24. In this case, as described above, an inert gas (such as argon (Ar) gas) with a flow rate of 2.1 m/sec or less is used as the pilot gas 23.

In this manner, when subjecting a ferritic stainless steel (the welding base material 26) having a plate thickness of 3 mm or less to non-keyhole welding, by using an inert gas (such as argon (Ar) gas) with a flow rate of 2.1 m/sec or less as the pilot gas 23, and using a mixed gas prepared by adding at least 1 vol % but not more than 6 vol % of carbon dioxide gas to an inert gas (such as argon (Ar) gas) as the shield gas 24, meandering of the weld bead and the occurrence of undercutting can be suppressed in the ferritic stainless steel having a plate thickness of 3 mm or less undergoing the non-keyhole welding, and a penetration weld bead can be produced with favorable form.

If the concentration of the aforementioned carbon dioxide gas is less than 1 vol %, then meandering tends to occur in the penetration weld bead. Further, if the concentration of the carbon dioxide gas exceeds 6 vol %, then the form of the penetration weld bead tends to become unstable.

Furthermore, if the concentration of the carbon dioxide gas contained within the shield gas 24 is set to at least 2 vol % but not more than 4.5 vol %, then meandering of the weld bead and undercutting can be better suppressed, and the penetration weld bead can be produced with even better form.

In the plasma welding method of the present embodiment, non-keyhole welding of the welding base material 26, which is composed of a ferritic stainless steel having a plate thickness of 3 mm or less, is performed by feeding an inert gas (such as argon (Ar) gas) into the pilot gas passage 13 of the plasma welding torch 10 illustrated in FIG. 1 at a flow rate of 2.1 msec or less, and feeding a mixed gas prepared by adding at least 0.5 vol % but not more than 4 vol % of oxygen gas to an inert gas (such as argon (Ar) gas), or a mixed gas prepared by adding at least 1 vol % but not more than 6 vol % of carbon dioxide gas to an inert gas (such as argon (Ar) gas), into the shield gas passage 16 as the shield gas 24, and therefore meandering of the weld bead and the occurrence of undercutting can be suppressed, and the penetration weld bead can be produced with favorable form.

A detailed description of preferred embodiments of the present invention has been presented above, but the present invention is in no way limited by these specific embodiments, and various modifications and alterations are possible without departing from the scope of the invention disclosed within the claims.

The embodiments have been described above using examples in which the inert gas that constituted the pilot gas 23 and the inert gas that constituted part of the shield gas 24 were the same inert gas (specifically, Ar gas), but the inert gas that constitutes the pilot gas 23 and the inert gas that constitutes part of the shield gas 24 may be different. Examples of the inert gases that may be used include Ar gas, helium (He) gas, and mixed gases containing Ar gas and He gas.

Specifics of the effects of the present invention are described below using a series of examples and comparative examples, but the present invention is in no way limited by these examples.

EXAMPLE 1 AND COMPARATIVE EXAMPLE 1

Example 1-1

Using the plasma welding torch 10 illustrated in FIG. 1, a welding base material 26 composed of a ferritic stainless steel (SUS430, plate thickness: 2 mm) was subjected to non-keyhole welding.

At this time, a tungsten electrode (ø4.8 mm) containing 2% of lanthanum oxide was used as the tungsten electrode 11, and the spacing between the center nozzle of the tungsten electrode 11 and the base material was set to 3 mm, the tilt angle of the plasma welding torch 10 was set with an angle of advance of 5 degrees, the inner diameter of the center nozzle of the tungsten electrode 11 was 3.2 mm, the welding current was set to 155 A, and the welding speed was set to 50 cm/min.

Furthermore, during the above non-keyhole welding, Ar gas (inert gas) was supplied as the pilot gas 23 at 0.6 l/min (liters/min) (a flow rate of 1.243 m/sec), and a mixed gas prepared by mixing 0.5 vol % of $O_2$ gas with Ar gas (inert gas) was supplied as the shield gas 24 at 20 l/min (liters/min).

The flow rate of the pilot gas 23 was determined using the formula below.

$$\text{Flow rate} = (\text{supply flow of pilot gas 23}) / ((3.14/4) \times D^2)$$

In the formula, D represents the inner diameter of the gas jetting portion of the insert chip 12.

Photographs of the surface of the weld bead and the penetration bead of the ferritic stainless steel following non-keyhole welding under the welding conditions described above, and the result of judging the quality of the external appearance of the weld based on the photographs are shown in FIG. 2.

In the quality column of FIG. 2, the symbol O (pass) indicates that both the surface of the weld bead and the penetration bead have favorable form (specifically, that the weld bead does not exhibit meandering or any significant unevenness), whereas the symbol × (fail) indicates that meandering or considerable unevenness exists in the weld bead.

As is evident from the photographs in FIG. 2, in the plasma welding method (non-keyhole welding) of Example 1-1, the surface of the weld bead exhibited favorable form. Further, although the width of the penetration weld bead was somewhat narrow, it was not of a level to cause problems.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 0.5 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 1-2 and 1-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 1-1. Inspection of the surface of the weld bead and the penetration bead confirmed that meandering of the weld bead and undercutting had been suppressed, and the penetration weld bead was of favorable form.

Comparative Example 1-1

With the exception of supplying Ar gas (inert gas) as the pilot gas 23 at 1.2 l/min (a flow rate of 2.486 m/sec), welding was performed under the same conditions as Example 1-1. Falling of the weld pool was confirmed, and non-keyhole welding could not be performed.

Examples 1-4 to 1-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 1-1. In each case, non-keyhole welding was able to be performed, and there were no problems with the form of the surface of the weld bead or the penetration bead.

Comparative Example 1-2

With the exceptions of altering the plate thickness of the ferritic stainless steel (SUS430) to 4 mm, and using an appropriate current (250 A), welding was performed under the same conditions as Example 1-1. As a result, a penetration weld bead was not formed on the ferritic stainless steel, and non-keyhole welding could not be performed.

Comparative Example 1-3

With the exception of supplying Ar gas (inert gas) as the pilot gas 23 at 1.2 l/min (a flow rate of 2.486 m/sec), welding was performed under the same conditions as Comparative Example 1-2. As a result, the pilot gas 23 penetrated through the ferritic stainless steel, causing keyhole welding of the ferritic stainless steel.

Example 2 AND COMPARATIVE EXAMPLE 2

Example 2-1

With the exception of using a mixed gas prepared by mixing 0.8 vol % of $O_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Example 2-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 0.8 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 2-2 and 2-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 2-1. Inspection of the surface of the weld bead and the penetration bead confirmed that meandering of the weld bead and undercutting had been suppressed, and the penetration weld bead was of favorable form.

Comparative Example 2-1

With the exception of supplying Ar gas (inert gas) as the pilot gas 23 at 1.2 l/min (a flow rate of 2.486 m/sec), welding was performed under the same conditions as Example 2-1. Falling of the weld pool was confirmed, and non-keyhole welding could not be performed.

Examples 2-4 to 2-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 2-1. In each case, non-keyhole welding was able to be performed, and there were no problems with the form of the surface of the weld bead or the penetration bead.

Comparative Example 2-2

With the exceptions of altering the plate thickness of the ferritic stainless steel (SUS430) to 4 mm, and using an appropriate current (250 A), welding was performed under the same conditions as Example 2-1. As a result, a penetration weld bead was not formed on the ferritic stainless steel, and non-keyhole welding could not be performed.

Comparative Example 2-3

With the exception of supplying Ar gas (inert gas) as the pilot gas 23 at 1.2 l/min (a flow rate of 2.486 m/sec), welding was performed under the same conditions as Comparative Example 2-2. As a result, the pilot gas 23 penetrated through the ferritic stainless steel, causing keyhole welding of the ferritic stainless steel.

EXAMPLE 3 AND COMPARATIVE EXAMPLE 3

Example 3-1

With the exception of using a mixed gas prepared by mixing 1 vol % of $O_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Example 3-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 1 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 3-2 and 3-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 1-1. Inspection of the surface of the weld bead and the penetration bead confirmed that meandering of the weld bead and undercutting had been suppressed, and the penetration weld bead was of favorable form.

Comparative Example 3-1

With the exception of supplying Ar gas (inert gas) as the pilot gas 23 at 1.2 l/min (a flow rate of 2.486 m/sec), welding was performed under the same conditions as Example 3-1. Falling of the weld pool was confirmed, and non-keyhole welding could not be performed.

Examples 3-4 to 3-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 3-1. In each case, non-keyhole welding was able to be performed, and there were no problems with the form of the surface of the weld bead or the penetration bead.

Comparative Example 3-2

With the exceptions of altering the plate thickness of the ferritic stainless steel (SUS430) to 4 mm, and using an appropriate current (250 A), welding was performed under the same conditions as Example 3-1. As a result, a penetration weld bead was not formed on the ferritic stainless steel, and non-keyhole welding could not be performed.

Comparative Example 3-3

With the exception of supplying Ar gas (inert gas) as the pilot gas 23 at 1.2 l/min (a flow rate of 2.486 m/sec), welding was performed under the same conditions as Comparative Example 3-2. As a result, the pilot gas 23 penetrated through the ferritic stainless steel, causing keyhole welding of the ferritic stainless steel.

EXAMPLE 4 AND COMPARATIVE EXAMPLE 4

Example 4-1

With the exception of using a mixed gas prepared by mixing 1.5 vol % of $O_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Example 4-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 1.5 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 4-2 and 4-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 4-1. Inspection of the surface of the weld bead and the penetration bead confirmed that meandering of the weld bead and undercutting had been suppressed, and the penetration weld bead was of favorable form.

Comparative Example 4-1

With the exception of supplying Ar gas (inert gas) as the pilot gas 23 at 1.2 l/min (a flow rate of 2.486 m/sec), welding was performed under the same conditions as Example 4-1. Falling of the weld pool was confirmed, and non-keyhole welding could not be performed.

Examples 4-4 to 4-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 4-1. In each case, non-keyhole welding was able to be performed, and there were no problems with the form of the surface of the weld bead or the penetration bead.

Comparative Example 4-2

With the exceptions of altering the plate thickness of the ferritic stainless steel (SUS430) to 4 mm, and using an appropriate current (250 A), welding was performed under the same conditions as Example 4-1. As a result, a penetration weld bead was not formed on the ferritic stainless steel, and non-keyhole welding could not be performed.

Comparative Example 4-3

With the exception of supplying Ar gas (inert gas) as the pilot gas 23 at 1.2 l/min (a flow rate of 2.486 m/sec), welding was performed under the same conditions as Comparative Example 4-2. As a result, the pilot gas 23 penetrated through the ferritic stainless steel, causing keyhole welding of the ferritic stainless steel.

EXAMPLE 5 AND COMPARATIVE EXAMPLE 5

Example 5-1

With the exception of using a mixed gas prepared by mixing 2 vol % of $O_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Example 5-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 2 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 5-2 and 5-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 5-1. Inspection of the surface of the weld bead and the penetration bead confirmed that meandering of the weld bead and undercutting had been suppressed, and the penetration weld bead was of favorable form.

Comparative Example 5-1

With the exception of supplying Ar gas (inert gas) as the pilot gas 23 at 1.2 l/min (a flow rate of 2.486 m/sec), welding was performed under the same conditions as Example 5-1. Falling of the weld pool was confirmed, and non-keyhole welding could not be performed.

Examples 5-4 to 5-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 5-1. In each case, non-keyhole welding was able to be performed, and there were no problems with the form of the surface of the weld bead or the penetration bead.

Comparative Example 5-2

With the exceptions of altering the plate thickness of the ferritic stainless steel (SUS430) to 4 mm, and using an appropriate current (250 A), welding was performed under the same conditions as Example 5-1. As a result, a penetration weld bead was not formed on the ferritic stainless steel, and non-keyhole welding could not be performed.

Comparative Example 5-3

With the exception of supplying Ar gas (inert gas) as the pilot gas 23 at 1.2 l/min (a flow rate of 2.486 m/sec), welding was performed under the same conditions as Comparative Example 5-2. As a result, the pilot gas 23 penetrated through the ferritic stainless steel, causing keyhole welding of the ferritic stainless steel.

EXAMPLE 6 AND COMPARATIVE EXAMPLE 6

Example 6-1

With the exception of using a mixed gas prepared by mixing 3 vol % of $O_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Example 6-1, the surface of the weld bead and the penetration bead exhibited favorable form. Further, although a small amount of oxidation of the penetration weld bead was observed, it was not of a level to cause problems.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 3 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 6-2 and 6-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 6-1. Inspection of the surface of the weld bead and the penetration bead confirmed that meandering of the weld bead and undercutting had been suppressed, and the penetration weld bead was of favorable form.

Comparative Example 6-1

With the exception of supplying Ar gas (inert gas) as the pilot gas 23 at 1.2 l/min (a flow rate of 2.486 m/sec), welding was performed under the same conditions as Example 6-1. Falling of the weld pool was confirmed, and non-keyhole welding could not be performed.

Examples 6-4 to 6-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 6-1. In each case, non-keyhole welding was able to be performed, and there were no problems with the form of the surface of the weld bead or the penetration bead.

Comparative Example 6-2

With the exceptions of altering the plate thickness of the ferritic stainless steel (SUS430) to 4 mm, and using an appropriate current (250 A), welding was performed under the same conditions as Example 6-1. As a result, a penetration weld bead was not formed on the ferritic stainless steel, and non-keyhole welding could not be performed.

Comparative Example 6-3

With the exception of supplying Ar gas (inert gas) as the pilot gas 23 at 1.2 l/min (a flow rate of 2.486 m/sec), welding was performed under the same conditions as Comparative Example 6-2. As a result, the pilot gas 23 penetrated through the ferritic stainless steel, causing keyhole welding of the ferritic stainless steel.

EXAMPLE 7 AND COMPARATIVE EXAMPLE 7

Example 7-1

With the exception of using a mixed gas prepared by mixing 4 vol % of $O_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Example 7-1, the surface of the weld bead and the penetration bead exhibited favorable form. Further, although a small amount of oxidation of the penetration weld bead was observed, it was not of a level to cause problems.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 4 vol % of $O_2$ gas with Ar gas (inert gas) as the shield gas 24 at 20 l/min, meandering of the weld bead and the occurrence of undercutting could be suppressed, and a penetration weld bead could be produced with favorable form.

Examples 7-2 and 7-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 7-1. Inspection of the surface of the weld bead and the penetration bead confirmed that meandering of the weld bead and undercutting had been suppressed, and the penetration weld bead was of favorable form.

Comparative Example 7-1

With the exception of supplying Ar gas (inert gas) as the pilot gas 23 at 1.2 l/min (a flow rate of 2.486 m/sec), welding was performed under the same conditions as Example 7-1. Falling of the weld pool was confirmed, and non-keyhole welding could not be performed.

Examples 7-4 to 7-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 7-1. In each case, non-keyhole welding was able to be performed, and there were no problems with the form of the surface of the weld bead or the penetration bead.

Comparative Example 7-2

With the exceptions of altering the plate thickness of the ferritic stainless steel (SUS430) to 4 mm, and using an appropriate current (250 A), welding was performed under the same conditions as Example 7-1. As a result, a penetration weld bead was not formed on the ferritic stainless steel, and non-keyhole welding could not be performed.

Comparative Example 7-3

With the exception of supplying Ar gas (inert gas) as the pilot gas 23 at 1.2 l/min (a flow rate of 2.486 m/sec), welding was performed under the same conditions as Comparative Example 7-2. As a result, the pilot gas 23 penetrated through the ferritic stainless steel, causing keyhole welding of the ferritic stainless steel.

EXAMPLE 8 AND COMPARATIVE EXAMPLE 8

Example 8-1

With the exception of using a mixed gas prepared by mixing 1 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 3.

As is evident from the photographs in FIG. 3, in the plasma welding method (non-keyhole welding) of Example 8-1, although the width of the penetration weld bead was somewhat narrow, it was not of a level to cause problems, and the surface of the weld bead and the penetration bead both exhibited favorable form.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 1 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Examples 8-2 and 8-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 8-1. Inspection of the surface of the weld bead and the penetration bead confirmed that meandering of the weld bead and undercutting had been suppressed, and the penetration weld bead was of favorable form.

Comparative Example 8-1

With the exception of supplying Ar gas (inert gas) as the pilot gas 23 at 1.2 l/min (a flow rate of 2.486 m/sec), welding was performed under the same conditions as Example 8-1. Falling of the weld pool was confirmed, and non-keyhole welding could not be performed.

Examples 8-4 to 8-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 8-1. In each case, non-keyhole welding was able to be performed, and there were no problems with the form of the surface of the weld bead or the penetration bead.

Comparative Example 8-2

With the exceptions of altering the plate thickness of the ferritic stainless steel (SUS430) to 4 mm, and using an appropriate current (250 A), welding was performed under the same conditions as Example 8-1. As a result, a penetration weld bead was not formed on the ferritic stainless steel, and non-keyhole welding could not be performed.

Comparative Example 8-3

With the exception of supplying Ar gas (inert gas) as the pilot gas 23 at 1.2 l/min (a flow rate of 2.486 m/sec), welding was performed under the same conditions as Comparative Example 8-2. As a result, the pilot gas 23 penetrated through the ferritic stainless steel, causing keyhole welding of the ferritic stainless steel.

EXAMPLE 9 AND COMPARATIVE EXAMPLE 9

Example 9-1

With the exception of using a mixed gas prepared by mixing 2 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 3.

As is evident from the photographs in FIG. 3, in the plasma welding method (non-keyhole welding) of Example 9-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 2 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Examples 9-2 and 9-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 9-1. Inspection of the surface of the weld bead and the penetration bead confirmed that meandering of the weld bead and undercutting had been suppressed, and the penetration weld bead was of favorable form.

Comparative Example 9-1

With the exception of supplying Ar gas (inert gas) as the pilot gas 23 at 1.2 l/min (a flow rate of 2.486 m/sec), welding was performed under the same conditions as Example 9-1. Falling of the weld pool was confirmed, and non-keyhole welding could not be performed.

Examples 9-4 to 9-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 9-1. In each case, non-keyhole welding was able to be performed, and there were no problems with the form of the surface of the weld bead or the penetration bead.

Comparative Example 9-2

With the exceptions of altering the plate thickness of the ferritic stainless steel (SUS430) to 4 mm, and using an appropriate current (250 A), welding was performed under the same conditions as Example 9-1. As a result, a penetration weld bead was not formed on the ferritic stainless steel, and non-keyhole welding could not be performed.

Comparative Example 9-3

With the exception of supplying Ar gas (inert gas) as the pilot gas 23 at 1.2 l/min (a flow rate of 2.486 m/sec), welding was performed under the same conditions as Comparative Example 9-2. As a result, the pilot gas 23 penetrated through the ferritic stainless steel, causing keyhole welding of the ferritic stainless steel.

EXAMPLE 10 AND COMPARATIVE EXAMPLE 10

Example 10-1

With the exception of using a mixed gas prepared by mixing 3 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless (SUS430, plate thickness: 2 mm) steel following non-keyhole welding, and the result of judging the quality of the external appearance of the weld based on the photographs are shown in FIG. 3.

As is evident from the photographs in FIG. 3, in the plasma welding method (non-keyhole welding) of Example 10-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 3 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Example 10-2

With the exception of altering the plate thickness of the ferritic stainless steel (SUS430) from 2 mm to 3 mm, non-keyhole welding was performed under the same conditions as Example 10-1. The result confirmed that there no problems with the form of the surface of the weld bead or the penetration bead.

Examples 10-3 and 10-4

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 10-1. Inspection of the surface of the weld bead and the penetration bead confirmed that meandering of the weld bead and undercutting had been suppressed, and the penetration weld bead was of favorable form.

Comparative Example 10-1

With the exception of supplying Ar gas (inert gas) as the pilot gas 23 at 1.2 l/min (a flow rate of 2.486 m/sec), welding was performed under the same conditions as Example 10-1. Falling of the weld pool was confirmed, and non-keyhole welding could not be performed.

Examples 10-5 and 10-6

With the exception of altering the plate thickness of the ferritic stainless steel (SUS430) to 3 mm, welding was performed under the same conditions as Example 10-3 and Example 10-4 respectively. In each case, non-keyhole welding was able to be performed, and there were no problems with the form of the surface of the weld bead or the penetration bead.

Comparative Example 10-2

With the exceptions of altering the plate thickness of the ferritic stainless steel (SUS430) to 4 mm, and using an appropriate current (250 A), welding was performed under the same conditions as Example 10-1. As a result, a penetration weld bead was not formed on the ferritic stainless steel, and non-keyhole welding could not be performed.

Comparative Example 10-3

With the exception of supplying Ar gas (inert gas) as the pilot gas 23 at 1.2 l/min (a flow rate of 2.486 m/sec), welding was performed under the same conditions as Comparative Example 10-2. As a result, the pilot gas 23 penetrated through the ferritic stainless steel, causing keyhole welding of the ferritic stainless steel.

EXAMPLE 11 AND COMPARATIVE EXAMPLE 11

Example 11-1

With the exception of using a mixed gas prepared by mixing 4 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 3.

As is evident from the photographs in FIG. 3, in the plasma welding method (non-keyhole welding) of Example 11-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 4 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Examples 11-2 and 11-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 11-1. Inspection of the surface of the weld bead and the penetration bead confirmed that meandering of the weld bead and undercutting had been suppressed, and the penetration weld bead was of favorable form.

Comparative Example 11-1

With the exception of supplying Ar gas (inert gas) as the pilot gas 23 at 1.2 l/min (a flow rate of 2.486 m/sec), welding was performed under the same conditions as Example 11-1. Falling of the weld pool was confirmed, and non-keyhole welding could not be performed.

Examples 11-4 to 11-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 11-1. In each case, non-keyhole welding was able to be performed, and there were no problems with the form of the surface of the weld bead or the penetration bead.

Comparative Example 11-2

With the exceptions of altering the plate thickness of the ferritic stainless steel (SUS430) to 4 mm, and using an appropriate current (250 A), welding was performed under the same conditions as Example 11-1. As a result, a penetration weld bead was not formed on the ferritic stainless steel, and non-keyhole welding could not be performed.

Comparative Example 11-3

With the exception of supplying Ar gas (inert gas) as the pilot gas 23 at 1.2 l/min (a flow rate of 2.486 m/sec), welding was performed under the same conditions as Comparative Example 11-2. As a result, the pilot gas 23 penetrated through the ferritic stainless steel, causing keyhole welding of the ferritic stainless steel.

EXAMPLE 12 AND COMPARATIVE EXAMPLE 12

Example 12-1

With the exception of using a mixed gas prepared by mixing 4.5 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 3.

As is evident from the photographs in FIG. 3, in the plasma welding method (non-keyhole welding) of Example 12-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 4.5 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Examples 12-2 and 12-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 12-1. Inspection of the surface of the weld bead and the penetration bead confirmed that meandering of the weld bead and undercutting had been suppressed, and the penetration weld bead was of favorable form.

Comparative Example 12-1

With the exception of supplying Ar gas (inert gas) as the pilot gas 23 at 1.2 l/min (a flow rate of 2.486 m/sec), welding was performed under the same conditions as Example 12-1. Falling of the weld pool was confirmed, and non-keyhole welding could not be performed.

Examples 12-4 to 12-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 12-1. In each case, non-keyhole welding was able to be performed, and there were no problems with the form of the surface of the weld bead or the penetration bead.

Comparative Example 12-2

With the exceptions of altering the plate thickness of the ferritic stainless steel (SUS430) to 4 mm, and using an appropriate current (250 A), welding was performed under the same conditions as Example 12-1. As a result, a penetration weld bead was not formed on the ferritic stainless steel, and non-keyhole welding could not be performed.

Comparative Example 12-3

With the exception of supplying Ar gas (inert gas) as the pilot gas 23 at 1.2 l/min (a flow rate of 2.486 m/sec), welding was performed under the same conditions as Comparative Example 12-2. As a result, the pilot gas 23 penetrated through the ferritic stainless steel, causing keyhole welding of the ferritic stainless steel.

EXAMPLE 13 AND COMPARATIVE EXAMPLE 13

Example 13-1

With the exception of using a mixed gas prepared by mixing 5 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel (SUS430, plate thickness: 2 mm) following non-keyhole welding, and the result of judging the quality of the external appearance of the weld based on the photographs are shown in FIG. 3.

As is evident from the photographs in FIG. 3, in the plasma welding method (non-keyhole welding) of Example 13-1, the surface of the weld bead and the penetration bead exhibited favorable form. Further, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 5 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Examples 13-2 and 13-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 13-1. Inspection of the surface of the weld bead and the penetration bead confirmed that meandering of the weld bead and undercutting had been suppressed, and the penetration weld bead was of favorable form.

Comparative Example 13-1

With the exception of supplying Ar gas (inert gas) as the pilot gas 23 at 1.2 l/min (a flow rate of 2.486 m/sec), welding was performed under the same conditions as Example 13-1. Falling of the weld pool was confirmed, and non-keyhole welding could not be performed.

Examples 13-4 to 13-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 13-1. In each case, non-keyhole welding was able to be performed, and there were no problems with the form of the surface of the weld bead or the penetration bead.

Comparative Example 13-2

With the exceptions of altering the plate thickness of the ferritic stainless steel (SUS430) to 4 mm, and using an appropriate current (250 A), welding was performed under the same conditions as Example 13-1. As a result, a penetration weld bead was not formed on the ferritic stainless steel, and non-keyhole welding could not be performed.

Comparative Example 13-3

With the exception of supplying Ar gas (inert gas) as the pilot gas 23 at 1.2 l/min (a flow rate of 2.486 m/sec), welding was performed under the same conditions as Comparative Example 13-2. As a result, the pilot gas 23 penetrated through the ferritic stainless steel, causing keyhole welding of the ferritic stainless steel.

EXAMPLE 14 AND COMPARATIVE EXAMPLE 14

Example 14-1

With the exception of using a mixed gas prepared by mixing 6 vol % of $CO_2$ gas with Ar gas (inert gas) as the shield gas 24, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 3.

As is evident from the photographs in FIG. 3, in the plasma welding method (non-keyhole welding) of Example 14-1, welding slag was observed on the penetration weld bead, but it was not of a level to cause problems. Further, the surface of the weld bead and the penetration bead exhibited favorable form. Furthermore, the width of the penetration weld bead was also confirmed as being satisfactorily broad.

In other words, it was confirmed that by performing non-keyhole welding of a ferritic stainless steel (SUS430, plate thickness: 2 mm) by supplying Ar gas (inert gas) as the pilot gas 23 at 0.6 l/min (a flow rate of 1.243 m/sec), and supplying a mixed gas prepared by mixing 6 vol % of $CO_2$ gas with Ar gas (inert gas) as the shield gas 24 at 20 l/min, meandering of the weld bead and the occurrence of undercutting could be suppressed, and a penetration weld bead could be produced with favorable form.

Examples 14-2 and 14-3

With the exception of supplying Ar gas (inert gas) as the pilot gas 23 at 0.8 l/min (a flow rate of 1.657 m/sec) or 1 l/min (a flow rate of 2.072 m/sec), non-keyhole welding was performed under the same conditions as Example 14-1. Inspection of the surface of the weld bead and the penetration bead confirmed that meandering of the weld bead and undercutting had been suppressed, and the penetration weld bead was of favorable form.

Comparative Example 14-1

With the exception of supplying Ar gas (inert gas) as the pilot gas 23 at 1.2 l/min (a flow rate of 2.486 m/sec), welding was performed under the same conditions as Example 14-1. Falling of the weld pool was confirmed, and non-keyhole welding could not be performed.

Examples 14-4 to 14-6

With the exceptions of using a ferritic stainless steel (SUS430) having a plate thickness of 3 mm, and supplying the pilot gas 23 (Ar gas) at 0.6 l/min (a flow rate of 1.243 m/sec), 0.8 l/min (a flow rate of 1.657 m/sec), or 1 l/min (a flow rate of 2.072 m/sec), welding was performed under the same conditions as Example 14-1. In each case, non-keyhole welding was able to be performed, and there were no problems with the form of the surface of the weld bead or the penetration bead.

Comparative Example 14-2

With the exceptions of altering the plate thickness of the ferritic stainless steel (SUS430) to 4 mm, and using an appropriate current (250 A), welding was performed under the same conditions as Example 14-1. As a result, a penetration weld bead was not formed on the ferritic stainless steel, and non-keyhole welding could not be performed.

Comparative Example 14-3

With the exception of supplying Ar gas (inert gas) as the pilot gas 23 at 1.2 l/min (a flow rate of 2.486 m/sec), welding was performed under the same conditions as Comparative Example 14-2. As a result, the pilot gas 23 penetrated through the ferritic stainless steel, causing keyhole welding of the ferritic stainless steel.

Comparative Example 15

With the exception of using Ar gas (containing no oxygen gas or carbon dioxide gas) as the shield gas, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Comparative Example 15, meandering of the weld bead was observed in the penetration bead.

In other words, when non-keyhole welding was performed using Ar gas as the shield gas, a satisfactory result could not be obtained.

Comparative Example 16

With the exception of using a mixed gas prepared by mixing 5 vol % of $O_2$ gas with Ar gas (inert gas) as the shield gas, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 2.

As is evident from the photographs in FIG. 2, in the plasma welding method (non-keyhole welding) of Comparative Example 16, meandering of the weld bead was observed in the penetration bead.

In other words, when non-keyhole welding was performed using a mixed gas prepared by mixing 5 vol % of $O_2$ gas with Ar gas (inert gas) as the shield gas, a satisfactory result could not be obtained.

Comparative Example 17

With the exception of using a mixed gas prepared by mixing 7 vol % of $CO_2$ gas with Ar gas (inert gas) as the shield gas, non-keyhole welding of a ferritic stainless steel (SUS430, plate thickness: 2 mm) was performed under the same conditions as Example 1-1.

Photographs of the surface of the weld bead and the penetration bead of the ferritic stainless steel following non-keyhole welding, and the result of judging the quality of the external appearance of the weld based on the photographs are shown in FIG. 3.

As is evident from the photographs in FIG. 3, in the plasma welding method (non-keyhole welding) of Comparative Example 3, meandering of the weld bead was observed in the penetration bead.

SUMMARY OF EVALUATION RESULTS OF EXAMPLES 1 TO 14 AND COMPARATIVE EXAMPLES 1 to 17

Based on the results of the aforementioned Examples 1 to 7 and Comparative Examples 15 and 16, it was confirmed that, when performing non-keyhole welding of a ferritic stainless steel (SUS430) having a plate thickness of 3 mm or less, by using a mixed gas prepared by adding at least 0.5 vol % but not more than 4 vol % of $O_2$ gas (oxygen gas) to Ar gas (an inert gas) as the shield gas 24, meandering of the weld bead and the occurrence of undercutting could be suppressed, and a penetration weld bead could be produced with favorable form.

Moreover, based on the results of Examples 1 to 5, it was evident that, when performing non-keyhole welding of a ferritic stainless steel (SUS430) having a plate thickness of 3 mm or less, the use of a mixed gas prepared by adding at least 0.8 vol % but not more than 1.5 vol % of oxygen gas ($O_2$ gas) to Ar gas (an inert gas) as the shield gas 24 was particularly desirable.

Further, based on the results of the aforementioned Examples 8 to 14 and Comparative Examples 15 and 17, it was confirmed that, when performing non-keyhole welding of a ferritic stainless steel (SUS430) having a plate thickness of 3 mm or less, by using a mixed gas prepared by adding at least 1 vol % but not more than 6 vol % of $CO_2$ gas (carbon dioxide gas) to Ar gas (an inert gas) as the shield gas 24, meandering of the weld bead and the occurrence of undercutting could be suppressed, and a penetration weld bead could be produced with favorable form.

Moreover, based on the results of Examples 8 to 13, it was evident that, when performing non-keyhole welding of a ferritic stainless steel (SUS430) having a plate thickness of 3 mm or less, the use of a mixed gas prepared by adding at least 2 vol % but not more than 4.5 vol % of $CO_2$ gas (carbon dioxide gas) to Ar gas (an inert gas) as the shield gas 24 was particularly desirable.

INDUSTRIAL APPLICABILITY

According to the present invention, non-keyhole welding of a ferritic stainless steel having a plate thickness of 3 mm or less can be performed with good suppression of meandering of the weld bead and the occurrence of undercutting, enabling the formation of a penetration weld bead of favorable form.

REFERENCE SIGNS LIST

10: Plasma welding torch
11: Tungsten electrode
11A: Tip
12: Insert chip
13: Pilot gas passage
15: Shield cap
16: Shield gas passage
18: Main arc power source
19: Pilot arc power source
22: Welding gas
23: Pilot gas
24: Shield gas
26: Welding base material

The invention claimed is:

1. A plasma welding method comprising:
   providing a ferritic stainless having a plate thickness of 3 mm or less, wherein the ferritic stainless does not contain Ni;
   providing a plasma welding torch having a tungsten electrode, an insert chip disposed so as to surround an outer periphery of the tungsten electrode, and a shield cap disposed so as to surround an outer periphery of the insert chip, wherein a tip of the tungsten electrode is disposed inside the insert chip; and
   performing non-keyhole welding of the ferritic stainless steel comprising
      generating a plasma from the tip of the tungsten electrode such that a weld pool of the ferritic stainless steel is formed,
      supplying an inert gas as a pilot gas into a gap between the tungsten electrode and the insert chip at a flow rate of 2.1 m/sec or less, and
      supplying a shield gas into a gap between the insert chip and the shield cap, wherein the shield gas is a mixed gas prepared by adding at least 0.5 vol % but not more than 4 vol % of oxygen gas to an inert gas.

2. The plasma welding method according to claim 1, wherein a concentration of the oxygen gas is at least 0.8 vol % but not more than 1.5 vol % of the mixed gas.

3. A plasma welding method comprising:
   providing a ferritic stainless having a plate thickness of 3 mm or less, wherein the ferritic stainless does not contain Ni;
   providing a plasma welding torch having a tungsten electrode, an insert chip disposed so as to surround an outer periphery of the tungsten electrode, and a shield cap disposed so as to surround an outer periphery of the insert chip, wherein a tip of the tungsten electrode is disposed inside the insert chip; and
   performing non-keyhole welding of the ferritic stainless steel comprising
      generating a plasma from the tip of the tungsten electrode such that a weld pool of the ferritic stainless steel is formed,
      supplying an inert gas as a pilot gas into a gap between the tungsten electrode and the insert chip at a flow rate of 2.1 m/sec or less, and
      supplying a shield gas into a gap between the insert chip and the shield cap, wherein the shield gas is a mixed gas prepared by adding at least 1 vol % but not more than 6 vol % of carbon dioxide gas to an inert gas.

4. The plasma welding method according to claim 3, wherein a concentration of the carbon dioxide gas is at least 2 vol % but not more than 4.5 vol % of the mixed gas.

* * * * *